(12) United States Patent  
Kinsella et al.

(10) Patent No.: US 8,959,506 B2
(45) Date of Patent: Feb. 17, 2015

(54) DEVICE FOR DISTRIBUTION OF CONTENT

(75) Inventors: Alexander Scott Kinsella, Kitchener (CA); Trevor Jay Timbeck, London (CA); Jeffrey Scott Mayerczak, Potomac, MD (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/440,345

(22) Filed: Apr. 5, 2012

(65) Prior Publication Data

US 2013/0042233 A1    Feb. 14, 2013

Related U.S. Application Data

(60) Provisional application No. 61/472,826, filed on Apr. 7, 2011.

(51) Int. Cl.
  *G06F 9/445* (2006.01)
  *G06F 9/44* (2006.01)

(52) U.S. Cl.
  CPC ..................................... *G06F 8/61* (2013.01)
  USPC ............ 717/175; 717/170; 717/174; 717/178

(58) Field of Classification Search
  CPC ..................................... G06F 8/61; G06F 8/65
  See application file for complete search history.

(56) References Cited

U.S. PATENT DOCUMENTS

| | | | |
|---|---|---|---|
| 7,007,083 B1 * | 2/2006 | Chesley | 709/224 |
| 7,117,355 B2 * | 10/2006 | Zomaya et al. | 713/100 |
| 8,255,903 B2 * | 8/2012 | Williams et al. | 717/174 |
| 8,266,615 B2 * | 9/2012 | Shapiro | 717/175 |
| 8,464,248 B2 * | 6/2013 | Moffatt et al. | 717/175 |
| 8,806,471 B2 * | 8/2014 | Vidal et al. | 717/170 |

(Continued)

FOREIGN PATENT DOCUMENTS

| | | |
|---|---|---|
| CA | 2773726 A1 | 10/2012 |
| EP | 1280059 A2 | 1/2003 |

(Continued)

OTHER PUBLICATIONS

Girardello et al., AppAware: which mobile applications are hot?, Sep. 2010, 4 pages.*

(Continued)

*Primary Examiner* — Thuy Dao
(74) *Attorney, Agent, or Firm* — Schwegman Lundberg & Woessner, P.A.

(57) ABSTRACT

A system, apparatus and method for distributing content are provided. A request to provide content available to associated computing devices is received from a computing device. A list of the content available for installation at the associated computing devices is retrieved from a content database by comparing respective device attributes of each of the associated computing devices with respective content attributes associated with the content, wherein the list further comprises indications of which respective content is available for installation at given ones of the associated computing devices. An indication of the list is transmitted to the computing device. In response, selection data indicative of a subset of the content on the list selected for installation at respective selected devices is received from the first computing device. Respective installation data for installing respective selected content is caused to be pushed to the respective selected devices.

15 Claims, 15 Drawing Sheets

(56) References Cited

U.S. PATENT DOCUMENTS

| | | | |
|---|---|---|---|
| 8,839,235 B2* | 9/2014 | Lee et al. | 717/178 |
| 2005/0039178 A1* | 2/2005 | Marolia et al. | 717/168 |
| 2005/0076325 A1* | 4/2005 | Bergin et al. | 717/100 |
| 2007/0150888 A1* | 6/2007 | Shapiro | 717/174 |
| 2009/0031298 A1* | 1/2009 | Brunet et al. | 717/175 |
| 2011/0041079 A1* | 2/2011 | Rive et al. | 715/747 |
| 2012/0185843 A1* | 7/2012 | Burke et al. | 717/174 |

FOREIGN PATENT DOCUMENTS

| | | |
|---|---|---|
| EP | 1280059 A3 | 11/2003 |
| EP | 1521175 A2 | 4/2005 |
| EP | 1521175 A3 | 8/2005 |
| EP | 1566731 A1 | 8/2005 |
| WO | WO-0229551 A2 | 4/2002 |

OTHER PUBLICATIONS

Masri et al., Device-Aware Discovery and Ranking of Mobile Services, 2009, 5 pages.*

"European Application Serial No. 12163496.8, Extended Search Report mailed Jun. 18, 2012", 7 pgs.

"European Application Serial No. 12163496.8, Response filed Mar. 15, 2013 to Extended European Search Report mailed Jun. 18, 2012", 9 pgs.

"Canadian Application Serial No. 2,773,726, Response filed Jul. 20, 2014 to Office Action mailed Dec. 23, 2013", 8 pgs.

"Canadian Application Serial No. 2,773,726, Office Action mailed Dec. 23, 2013", 3 pgs.

European Application Serial No. 12163496.8, Examination Notification Art. 94(3) mailed Nov. 17, 2014, 7 pgs.

* cited by examiner

DEVICE FOR DISTRIBUTION OF CONTENT

CROSS-REFERENCE TO RELATED APPLICATIONS

This application claims priority to U.S. Provisional Patent Application No. 61/472,826 filed Apr. 7, 2011, the content of which is incorporated herein by reference in its entirety.

FIELD

The specification relates generally to computing devices, and specifically to a device for selection and distribution of content, and a method and system therefor.

BACKGROUND

The evolution of computers is currently quite active in the mobile device environment. It is now well-known to install content at mobile devices. Indeed, there has been a veritable explosion of the number and type of content, such as applications, that are configured to the unique form factors and computing environments of mobile devices and other computing environments.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
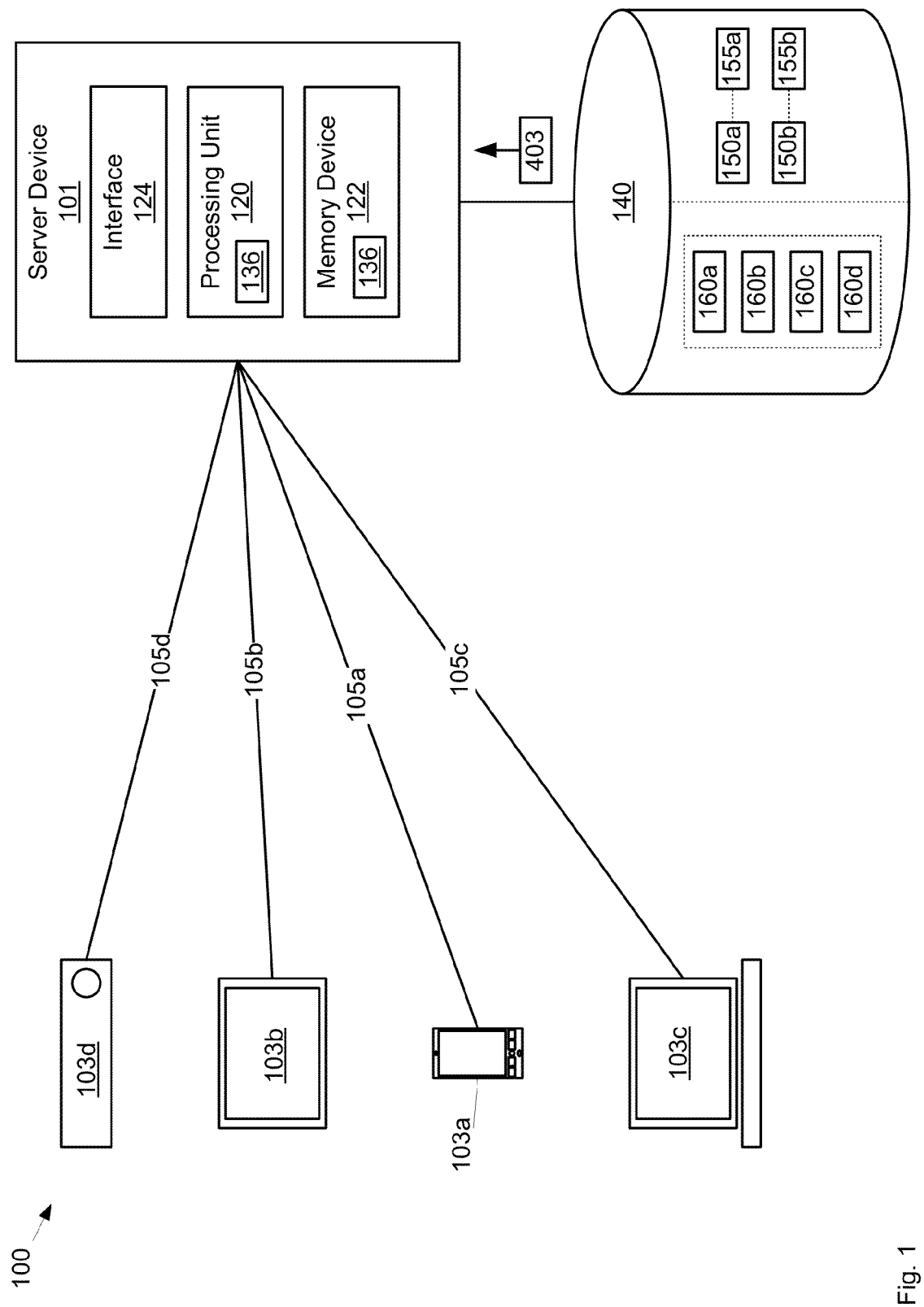
FIG. 1 depicts a system for distribution of content, according to non-limiting implementations.

An aspect of the specification provides a server device comprising: a processor and a communication interface, the processor enabled to: receive, from a first computing device via the communication interface, a request to provide content available to a plurality of associated computing devices, the plurality of associated computing devices including the first computing device; retrieve from a content database a list of the content available for installation at the plurality of associated computing devices by comparing respective device attributes of each of the plurality of associated computing devices with respective content attributes associated with the content, wherein the list further comprises indications of which respective content is available for installation at given ones of the plurality of associated computing devices; transmit, to the first computing device via the communication interface, an indication of the list; in response, receive, from the first computing device via the communication interface, selection data indicative of a subset of the content on the list selected for installation at respective selected devices of the plurality of associated computing devices; and cause respective installation data for installing respective selected content to be pushed to the respective selected devices.

The list can further comprise installed content already installed at the plurality of associated computing devices.

The list can further comprise an indication that given content installed at a given device of the plurality of associated computing devices is available for installation at others of the plurality of associated computing devices based on the comparing.

The list can further comprise an indication that given content installed at a given device of the plurality of associated computing devices is unavailable for installation at others of the plurality of associated computing devices based on the comparing.

The server device can further comprise a memory storing the content database.

The respective installation data can be stored in the content database in association with the respective content attributes.

At least one of the respective selected devices can be different from the first computing device such that the first computing device triggers installation of a given selected content at a different computing device via the selection data.

The list can be sorted according to at least one of the respective content, the plurality of associated computing devices, and availability for installation of each of the respective content.

Another aspect of the specification provides a server device comprising: a processor and a communication interface, the processor enabled to: receive, from a first computing device via the communication interface, a request to provide content installed at a plurality of associated computing devices, the plurality of associated computing devices including the first computing device; retrieve from a content database a list of the content installed at each of the plurality of associated computing devices and an indication of whether the content is available for installation at others of the plurality of associated computing devices by comparing respective device attributes of each of the plurality of associated computing devices with respective content attributes associated with the content; transmit, to the first computing device via the communication interface, an indication of the list; in response, receive, from the first computing device via the communication interface, selection data indicative of a subset of the content on the list selected for installation at respective selected devices of the plurality of associated computing devices; and cause respective installation data for installing respective selected content to be pushed to the respective selected devices.

A further aspect of the specification provides a method comprising: receiving at a server, from a first computing device, via a communication interface, a request to provide content available to a plurality of associated computing devices, the plurality of associated computing devices including the first computing device; retrieving from a content database a list of the content available for installation at the plurality of associated computing devices by comparing respective device attributes of each of the plurality of associated computing devices with respective content attributes associated with the content, wherein the list can further comprise indications of which respective content is available for installation at given ones of the plurality of associated computing devices; transmitting, to the first computing device via the communication interface, an indication of the list; in response, receiving, from a first computing device via the communication interface, selection data indicative of a subset of the content on the list selected for installation at respective selected devices of the plurality of associated computing devices; and causing respective installation data for installing respective selected content to be pushed to the respective selected devices.

The list can further comprise installed content already installed at the plurality of associated computing devices.

The list can further comprise an indication that given content installed at a given device of the plurality of associated computing devices is available for installation at others of the plurality of associated computing devices based on the comparing.

The list can further comprise an indication that given content installed at a given device of the plurality of associated computing devices is unavailable for installation at others of the plurality of associated computing devices based on the comparing.

The respective installation data can be stored in the content database in association with the respective content attributes.

At least one of the respective selected devices can be different from the first computing device such that the first computing device triggers installation of a given selected content at a different computing device via the selection data.

The list can be sorted according to at least one of the respective content, the plurality of associated computing devices, and availability for installation of each of the respective content.

Yet another aspect of the specification provides a method comprising: receiving at a server, from a first computing device, via a communication interface, a request to provide content installed at a plurality of associated computing devices, the plurality of associated computing devices including the first computing device; retrieving from a content database a list of the content installed at each of the plurality of associated computing devices and an indication of whether the content is available for installation at others of the plurality of associated computing devices by comparing respective device attributes of each of the plurality of associated computing devices with respective content attributes associated with the content; transmitting, to the first computing device via the communication interface, an indication of the list; in response, receiving, from a first computing device via the communication interface, selection data indicative of a subset of the content on the list selected for installation at respective selected devices of the plurality of associated computing devices; and causing respective installation data for installing respective selected content to be pushed to the respective selected devices.

A further aspect of the specification provides a computer program product, comprising a computer usable medium having a computer readable program code adapted to be executed to implement a method for: receiving at a server, from a first computing device, via a communication interface, a request to provide content available to a plurality of associated computing devices, the plurality of associated computing devices including the first computing device; retrieving from a content database a list of the content available for installation at the plurality of associated computing devices by comparing respective device attributes of each of the plurality of associated computing devices with respective content attributes associated with the content, wherein the list can further comprise indications of which respective content is available for installation at given ones of the plurality of associated computing devices; transmitting, to the first computing device via the communication interface, an indication of the list; in response, receiving, from a first computing device via the communication interface, selection data indicative of a subset of the content on the list selected for installation at respective selected devices of the plurality of associated computing devices; and causing respective installation data for installing respective selected content to be pushed to the respective selected devices.

Another aspect of the specification provides a computer program product, comprising a computer usable medium having a computer readable program code adapted to be executed to implement a method for: receiving at a server, from a first computing device, via a communication interface, a request to provide content installed at a plurality of associated computing devices, the plurality of associated computing devices including the first computing device; retrieving from a content database a list of the content installed at each of the plurality of associated computing devices and an indication of whether the content is available for installation at others of the plurality of associated computing devices by comparing respective device attributes of each of the plurality of associated computing devices with respective content attributes associated with the content; transmitting, to the first computing device via the communication interface, an indication of the list; in response, receiving, from a first computing device via the communication interface, selection data indicative of a subset of the content on the list selected for installation at respective selected devices of the plurality of associated computing devices; and causing respective installation data for installing respective selected content to be pushed to the respective selected devices.

FIG. 1 depicts a system 100 for distribution of content, according to non-limiting implementations. System 100 comprises a server device 101 and a plurality of computing devices 103a, 103b, 103c, 103d in communication with server device 101 via respective links 105a, 105b, 105c, 105d. Server device 101 will be interchangeably referred to hereafter as server 101. Devices 103a, 103b, 103c, 103d will be referred to in the plural as devices 103 and generically as a device 103. This convention will be used hereafter; for example, links 105a, 105b, 105c, 105d will be referred to hereafter in the plural as links 105 and generically as a link 105. Server 101 comprises a processing unit 120 interconnected with a memory device 122 and a communication interface 124, for example, via a computing bus (not depicted). While not depicted, server 101 can optionally comprise a display device and an input device. Memory device 122 and communication interface 124, will also be referred to hereafter as, respectively, memory 122 and interface 124. Server 101 further comprises an application 136 for managing distribution of content, as will be explained below, including, but not limited to, a content distribution service. Application 136 can be stored in memory 122 and processed by processing unit 120.

Content that can be distributed herein can include but is not limited to applications (e.g., "apps"), games, audio content, video content, and the like.

Server 101 is enabled for accessing a database 140 storing content installation data 150, interchangeably referred to hereafter as installation data 150. As will be explained below, each set of content installation data 150 is associated with content attribute data 155, as represented by the dotted line between each of installation data 150 and attribute data 155 in FIG. 1. Each set of attribute data 155 comprises data indicative of a platform that content associated with installation data 150 requires in order to install and run properly on a given device. For example, associated content can require a given operating system, screen size, data connection, and/or require specific functionality (e.g., GPS (Global Positioning System)/LBS (Location Based Services)) at a given device in order for the associated content to install and function correctly. Hence, each set of attribute data 155 is indicative of the attributes of a given device that an associated content can expect and/or require to install and function correctly.

Server 101 can be based on any well-known server environment including a module that houses one or more central processing units (e.g., processing unit 120), volatile memory (e.g., random access memory), persistent memory (e.g., hard disk devices, memory 122) and network interfaces (e.g., interface 124) to allow server 101 to communicate over relevant links, such as links 105. For example, server 101 can be a Sun Fire V480 running a UNIX operating system, from Sun Microsystems, Inc. of Palo Alto Calif., having four central processing units each operating at about nine-hundred megahertz, and having about sixteen gigabytes of random access memory. However, it is to be emphasized that this particular server is merely exemplary, and a vast array of other types of computing environments for server 101 are contemplated. Those skilled in the art will now recognize that non-volatile storage and volatile storage are examples of computer readable media that can store programming instructions executable on the processors of each server. It is further appreciated that server 101 can comprise any suitable number of servers that can perform different functionality of server implementations described herein.

Processing unit 120 comprises any suitable processor, or combination of processors, including, but not limited to, a microprocessor, a central processing unit (CPU) and the like. Other suitable processing units are within the scope of present implementations.

Memory 122 can comprise any suitable memory device, including, but not limited to, any suitable one of, or combination of, volatile memory, non-volatile memory, random access memory (RAM), read-only memory (ROM), hard drive, optical drive, flash memory, magnetic computer storage devices (e.g., hard disks, floppy disks, and magnetic tape), optical discs, and the like. Other suitable memory devices are within the scope of present implementations. In particular, memory 122 is enabled to store application 136.

Communication interface 124 comprises any suitable communication interface, or combination of communication interfaces. In particular interface 124 is enabled to communicate with devices 103 via links 105. Accordingly, interface 124 is enabled to communicate according to any suitable protocol including, but not limited to, wired protocols, wireless protocols, cell-phone protocols, wireless data protocols, Internet protocols, packet-based protocols, analogue, PSTN (public switched telephone network) protocols, WiFi protocols, WiMax protocols, a combination of two or more of such protocols, and/or the like.

Database 140 can be any suitable database and can be stored on one or more database servers (not depicted) in communication with server 101. Alternatively, database 140 can be stored at memory device 122.

Each link 105 can comprise any suitable combination of wired and/or wireless links as desired including, but not limited to, cables, wired networks, wireless networks, the Internet, packet-based networks, analog networks, the PSTN, LAN networks, WAN networks, WiFi networks, WiMax networks, or the like.

Figure 2:
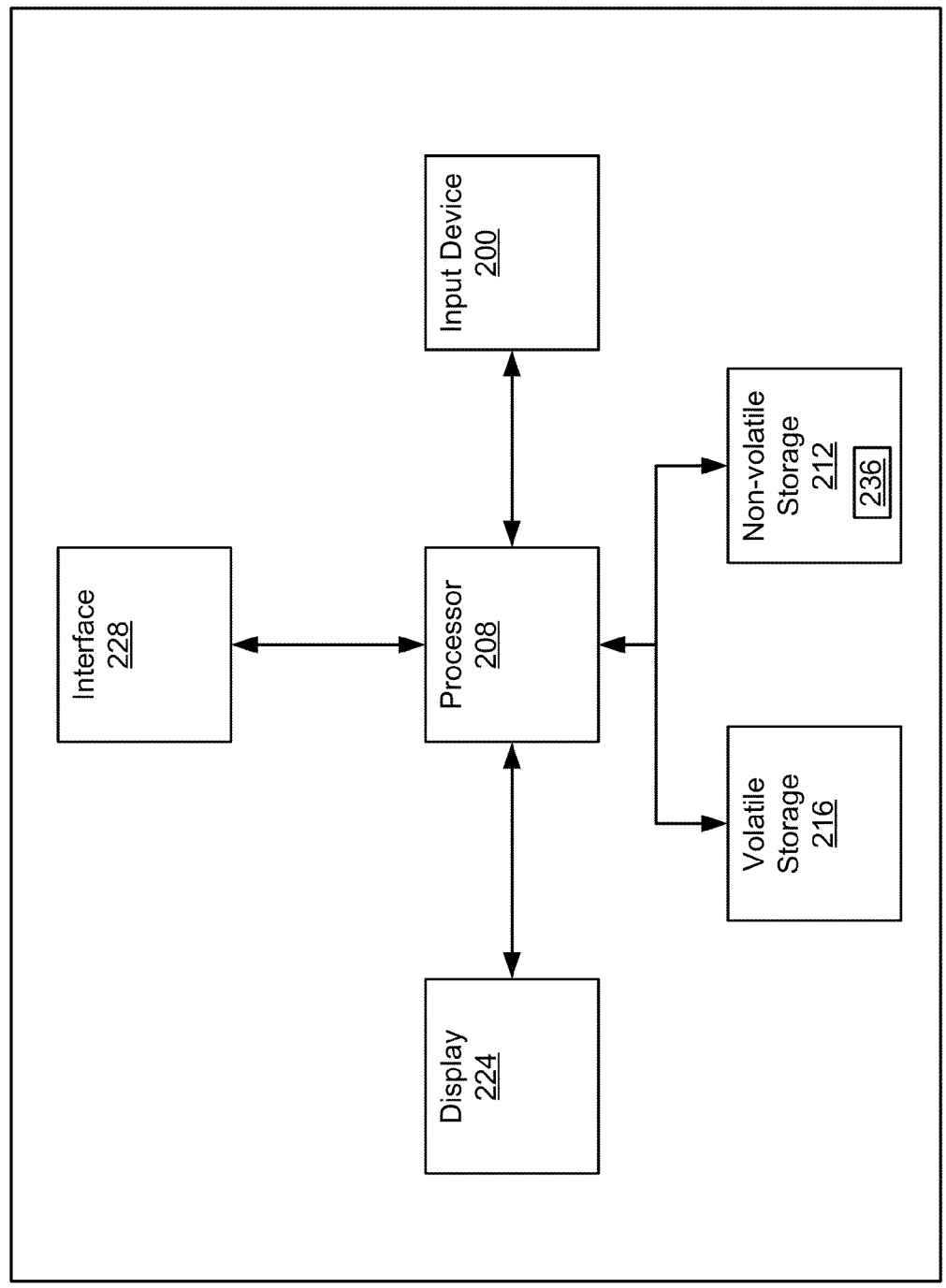
FIG. 2 depicts a computing device for distribution of content, according to non-limiting implementations, according to non-limiting implementations.

Referring briefly now to FIG. 2, each device 103 can be any type of electronic device that can be used in a self-contained manner and to interact with server 101 via links 105. Interaction includes displaying of information on a device 103 as well as to receive input at a device 103 that can in turn be sent to server 101 via a respective link 105. It should be emphasized that the structure in FIG. 2 is purely exemplary, and contemplates a device that can be used for both wireless voice (e.g., telephony) and wireless data (e.g., email, web browsing, text) communications.

Device 103 thus includes at least one input device 200. Input device 200 is generally enabled to receive input data, and can comprise any suitable combination of input devices, including, but not limited to, a keyboard, a keypad, a pointing device, a mouse, a track wheel, a trackball, a touchpad, a touch screen and the like. Other suitable input devices are within the scope of present implementations.

Input from input device 200 is received at processor 208 (which can be implemented as a plurality of processors). Processor 208 is configured to communicate with a non-volatile storage unit 212 (e.g., Erasable Electronic Programmable Read Only Memory ("EEPROM"), Flash Memory) and a volatile storage unit 216 (e.g., random access memory ("RAM")). Programming instructions that implement the functional teachings of device 101 as described herein are typically maintained, persistently, in non-volatile storage unit 212 and used by processor 208 which makes appropriate utilization of volatile storage 216 during the execution of such programming instructions. Those skilled in the art will now recognize that non-volatile storage unit 212 and volatile storage 216 are examples of computer readable media that can store programming instructions executable on processor 208.

In particular, non-volatile storage 212 can store an application 236 for accessing server 101, such as an application for accessing a content distribution service, which can be processed by processor 208.

Processor 208 in turn can also be coupled to a display 224 and optionally a speaker. Display 224 comprises any suitable one or combination of CRT (cathode ray tube) and/or flat panel displays (e.g., LCD (liquid crystal display), plasma, OLED (organic light emitting diode), capacitive or resistive touchscreens, and the like).

In some implementations, input device 200 and display 224 are external to device 103, with processor 208 in communication with each of input device 200 and display 224 via a suitable connection and/or link.

Processor 208 also connects to a network interface 228, which can be implemented in some implementations as radios configured to communicate over respective links 105. In general, it will be understood that interface 228 is configured to correspond with the network architecture that is used to implement a respective link 105. (In other implementations a plurality of links 105 with different protocols can be employed for each device 103 and thus a plurality of interfaces can be provided to support each link.) It should be understood that in general a wide variety of configurations for device 103 are contemplated.

Returning to FIG. 1, it is further contemplated that each of devices 103 can be differently or similarly configured as defined by attributes associated with each device 103. Such differences can include but are not limited to: each device 103 can have a different screen size of display 224; each device 103 can be associated with different service/data access plans that support different data connection rates, limits and bandwidths; each device 103 can have different GPS (Global Positioning System)/LBS (Location Based Service) functionality (for example, some devices 103 can include a GPS module (not depicted in FIG. 2), while other devices 103 are lacking a GPS module); and each device 103 can comprise different operating systems. Other different or similar attributes are within the scope of present implementations.

In any event, it is appreciated that some content that can be received from, for example, database 140 in the form of installation data 150, will run on some of devices 103 and will not run on other of devices 103.

For example, in present implementations, device 103a comprises a mobile electronic device with the combined functionality of a personal digital assistant, a cell phone, and an email paging device. Many well known cellular telephone models, or variants thereof, are suitable for present implementations.

Furthermore, in present implementations device 103b comprises a tablet device, with the combined functionality of a mobile computer, a personal digital assistant, a communication device, a network access device and the like. Many well known tablet devices, or variants thereof, are suitable for present implementations.

Furthermore, in present implementations, device 103c comprises a personal computer, including but not limited to a laptop computer and the like. Many well known personal computers, or variants thereof, are suitable for present implementations.

Finally, in present implementations, device 103d comprises a set-top-box (STB) for connection to a television device (e.g., display 224 can comprise an external television device). Many well known STBs, or variants thereof, including but, not limited to, cable receivers, satellite receivers, optical fibre receivers, PVRs (personal video recorders), digital media receivers, or the like, are suitable for present implementations.

In any event, it is understood that each device 103 can have different attributes to provide different or similar functionality. It is further appreciated that while four devices 103 are described herein, any suitable number of devices 103 are within the scope of present implementations.

Attributes of each device 103 can be stored in database 140 as respective attribute data 160 via a provisioning process and/or a registration process. In other implementations, attribute data 160 can be stored in a different database 140 (e.g., at a different registration server or the like), accessible to server 101. For example, respective attribute data 160 can comprise an indication of a respective operating system, screen size, functionality (such as GPS/LBS functionality), data plan, or the like for each device 103.

It is yet further appreciated that attribute data 160 need not be stored for all devices 103. For example, in some implementations, device 103c comprises a personal computer which can be used to access server 101 to search for content and cause content to be pushed to other devices 103, for example, via a browser application, but is not configured to process content stored at database 140. In these implementations, attribute data 160c is optionally not provisioned and/or stored at database 140 or the like.

It is yet further appreciated that devices 103 are associated with one another as indicated by the stippled box surrounding attribute data 160 in FIG. 1. For example, devices 103 can be associated with a given user and/or a given account or the like. For example, devices 103a, 103b, 103d can all be associated with a given account at server 101, and device 103c can be associated with devices 103a, 103b, 103d by virtue of device 103c being used to access the given account at server 101.

Figure 3:
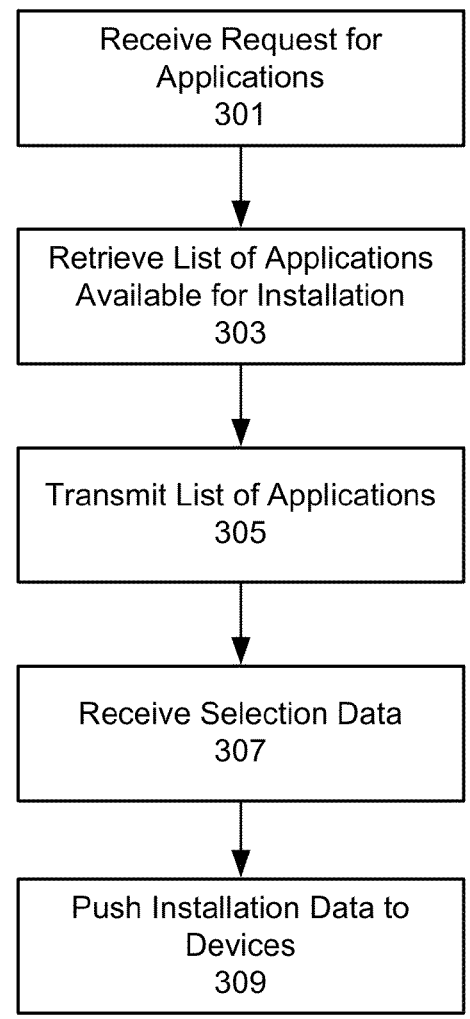
FIG. 3 depicts a method for distribution of content, according to non-limiting implementations.

Attention is now directed to FIG. 3 which depicts a method 300 for selection and distribution of content. In order to assist in the explanation of method 300, it will be assumed that method 300 is performed using system 100. Furthermore, the following discussion of method 300 will lead to a further understanding of system 100 and its various components. However, it is to be understood that system 100 and/or method 300 can be varied, and need not work exactly as discussed herein in conjunction with each other, and that such variations are within the scope of present implementations. It is appreciated that in the following description, method 300 is implemented in system 100 by processing unit 120. Furthermore, in the description of method 300, reference will be made to FIGS. 4 to 7, which are each substantially similar to FIG. 1, with like elements having like numbers.

It will further be assumed in the following description that server 101 is being accessed from device 103a via link 105a, though it is appreciated that server 101 can be accessed from any of devices 103.

Figure 4:
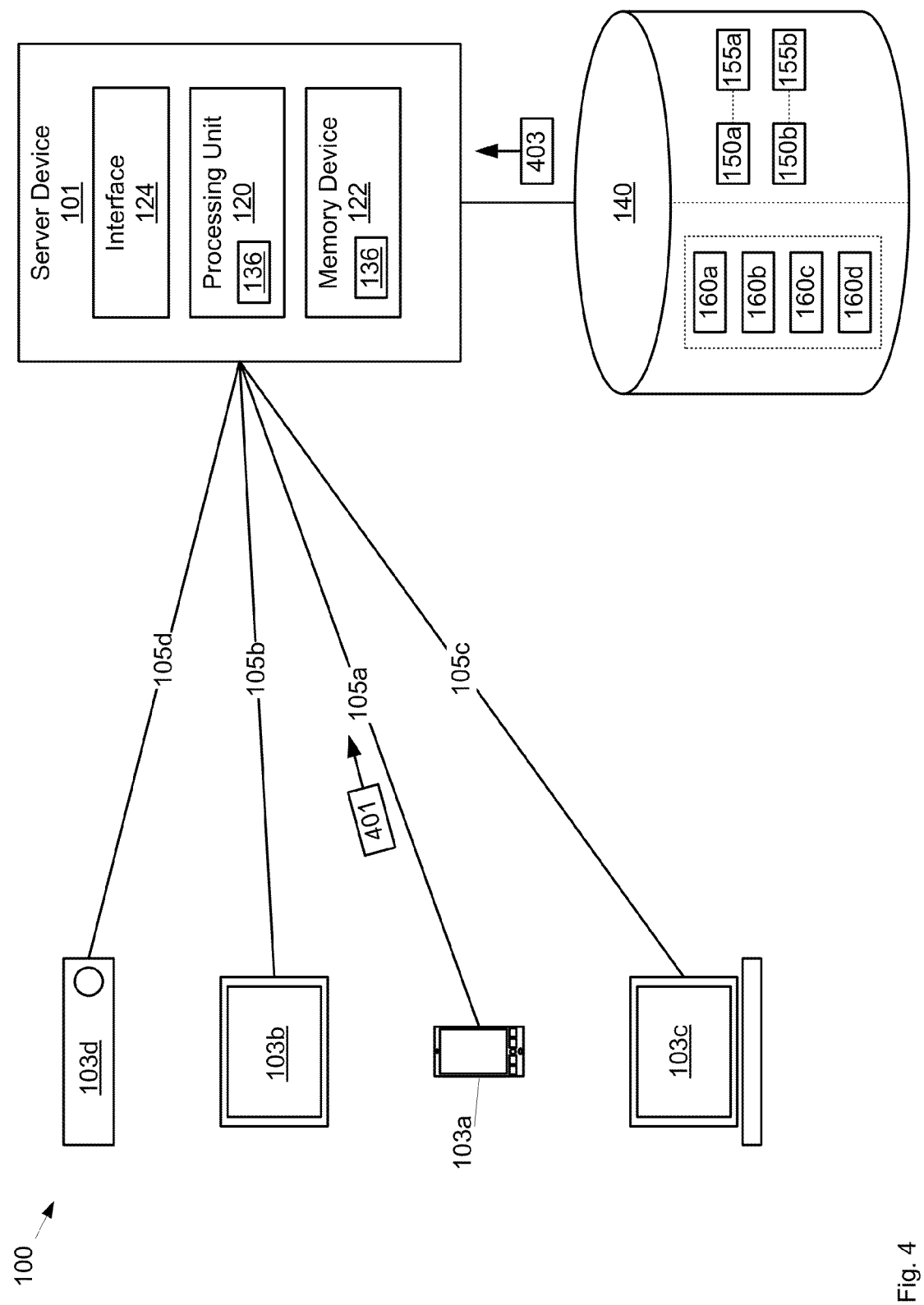
FIGS. 4 to 7 depict systems for distribution of content, according to non-limiting implementations.
Figure 5:
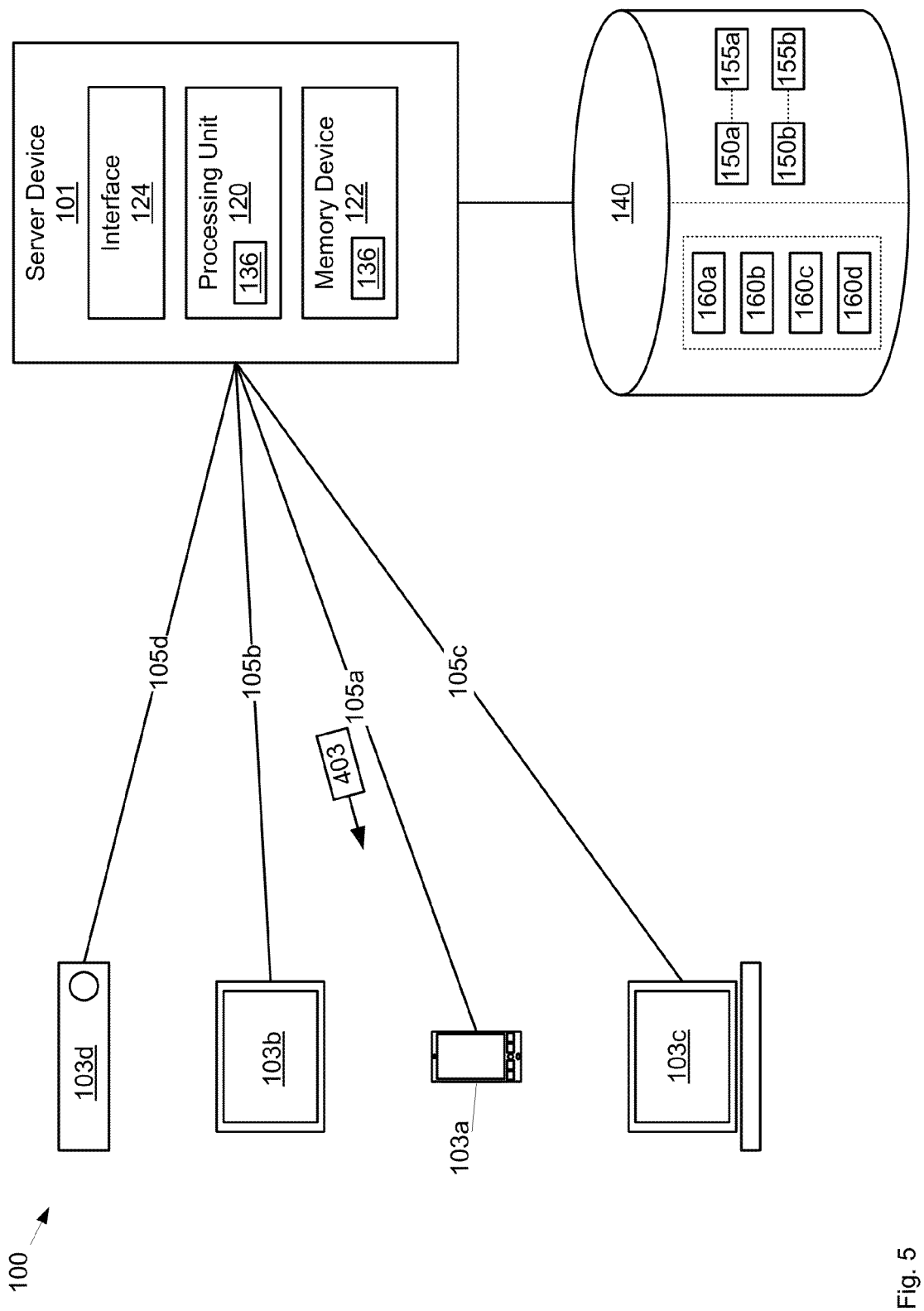
Figure 6:
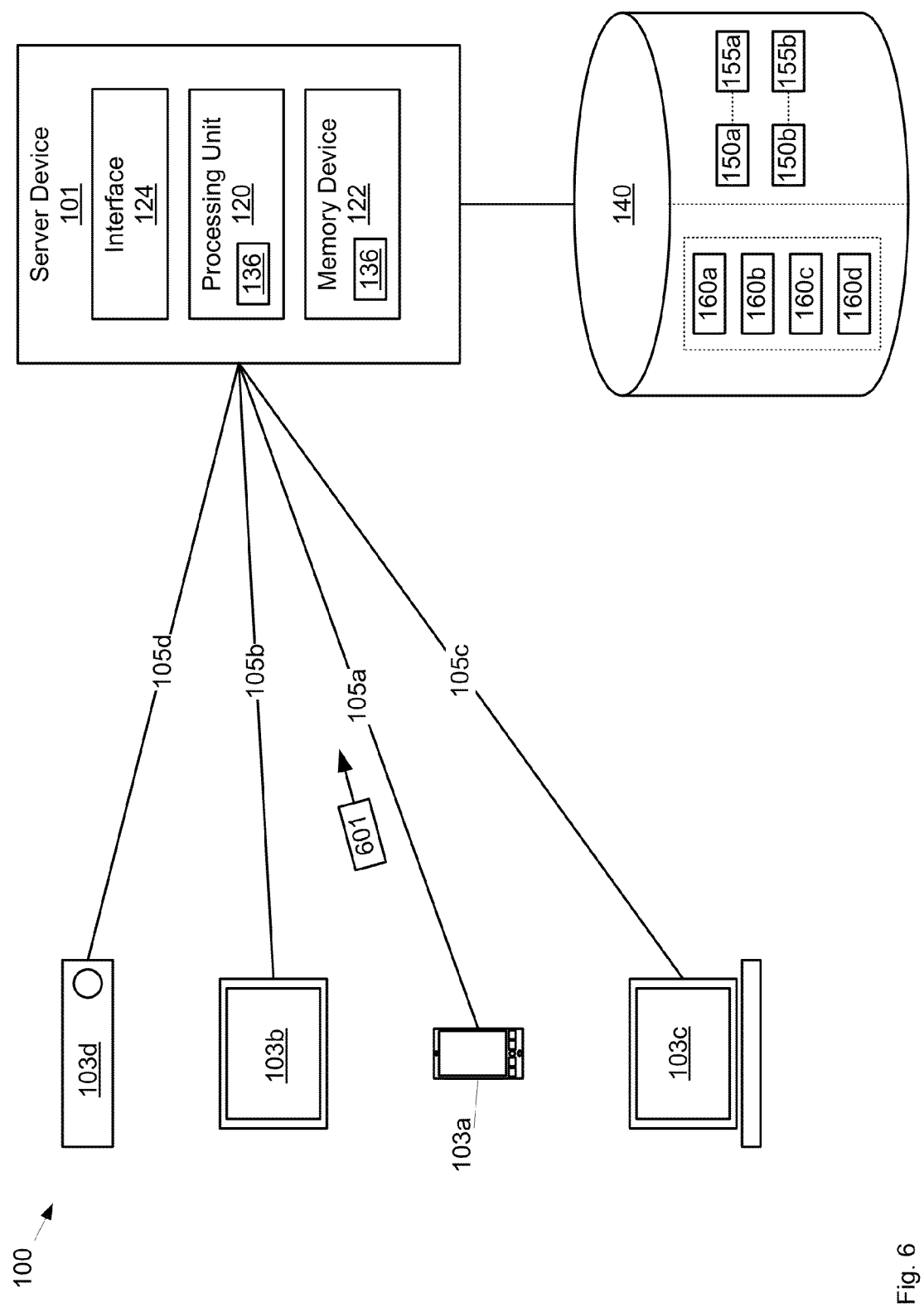
Figure 7:
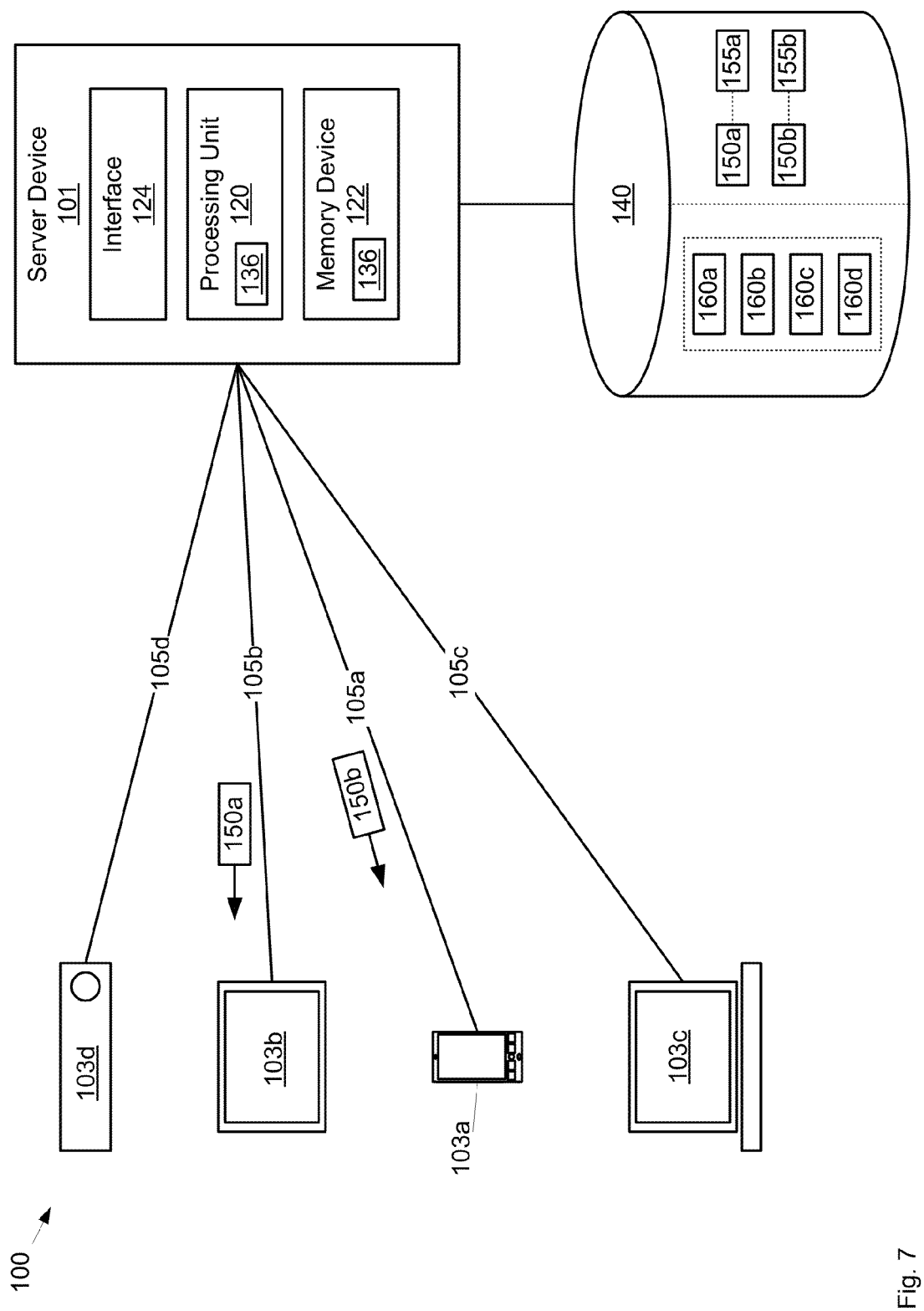

At 301, and with reference to FIG. 4, a request 401 is received at server 101 from device 103a via link 105a. Request 401 generally comprises a request to provide content available to devices 103. For example, request 401 can comprise a request initiated from application 236 to access a content distribution service. It is further appreciated that request 401 is understood to have been received by server 101, for example, via link 105a from device 103a. Alternatively, a communication session between server 101 and device 103a can be established in which device 103a "logs in" to a content distribution service such as application 136, via the associated application 236 at device 103a. For example, as will be described below, a rendering of application 236 can be provided at display 224 to access application 136 at server 101, with data being exchanged between applications 136, 236 to cause content to be distributed. Request 401 can further include at least one search parameter. For example, request 401 can include text indicating that content corresponding to "word games" are to be searched.

At 303, server 101 retrieves from database 140 a list 403 of content available for installation at devices 103 that match at least one search parameter of the request 401 and which are available for installation by comparing respective device attributes in the form of attribute data 160 with respective content attributes in the form of content attribute data 155. For example, list 403 can be compiled in the form of database calls to database 140, by first searching for content that meets the at least one search parameter, and then filtering the results by retrieving attribute data 160 and then requesting indicators from database 140 of content whose associated content attribute data 155 matches one or more sets of device attribute data 160. Hence, list 403 will include indicators of content that meet both the at least one search parameter (e.g., "word games") and which are available for installation at one or more of devices 103. In some implementations, some content will be installable on one or more of devices 103 but not others of devices 103 and list 403 can comprise a suitable indicator of such. Hence list 403 can comprise indications of which respective content is available for installation at given ones of devices 103.

At 305, list 403 or an indication thereof, is transmitted (FIG. 5) back to device 103a such that list 103 can be rendered at display 224, for example, within application 236.

A selection of content from list 403 is then received in any suitable manner from input device 200 and device 103a generates selection data 601 indicative of a subset of the content on list 403 selected for installation at respective selected devices 103. Device 103a then transmits selection data 601 to server 101 (FIG. 6), and server 101 receives selection data 601 at 307.

At 309, server 101 processes selection data 601 and causes respective installation data 150 to be pushed to respective selected devices 103. For example, in FIG. 7, it is assumed that content associated with installation data 150a is to be pushed to device 103b and content associated with installation data 150b is to be pushed to device 103a, and hence selection data 601 comprises selections of respective content and optionally a given respective device 103 on which it is to be installed. Hence, server 101 causes installation data 150b to be pushed to device 103a and causes installation data 150a to be pushed to device 103b. In depicted implementations, server 101 transmits installation data 150, however in other implementations, server 101 transmits instructions to trigger the push of installation data 150 to a push server (not depicted), or the like, which in turn retrieves and transmits installation data 150 to respective devices 103.

In some implementations, associated content can be installed automatically when installation data 150 is received at respective device 103, while in other implementations, associated content can be installed upon receiving confirmation that the associated content is to be installed from respective input devices 200 (e.g., application 236 provides an indication of receipt of installation data 150 and requests confirmation or the like that the installation 150 is to be installed before proceeding).

Hence, method 300 provides a filtered list 403 of content respective to each device 103, and pushes selected content to respective selected devices 103. Furthermore, at least one of the respective selected devices 103 is different from device 103a, such that device 103a triggers installation of given selected content at a different computing device 103 from device 103a via selection data 601.

It is furthermore appreciated, that requests for list 403 and associated responses can be implemented in suitable APIs (application programming interfaces) at either of applications 136, 236.

Figure 8:
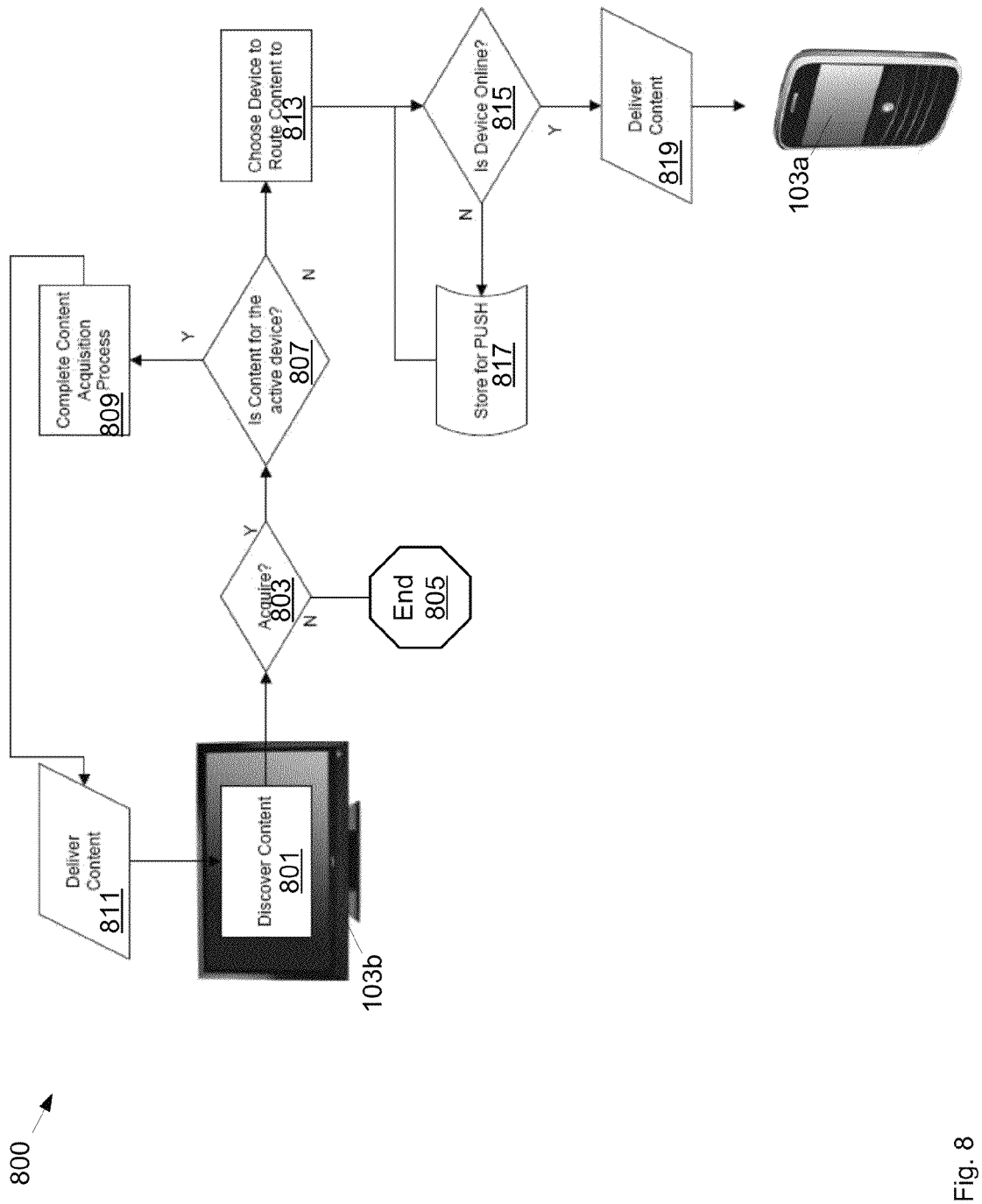
FIG. 8 depicts a method for distribution of content, according to non-limiting implementations.

Attention is next directed to FIG. 8 which depicts a method 800 for selection and distribution of content. In order to assist in the explanation of method 800, it will be assumed that method 800 is performed using system 100. Furthermore, the following discussion of method 800 will lead to a further understanding of system 100 and its various components. However, it is to be understood that system 100 and/or method 800 can be varied, and need not work exactly as discussed herein in conjunction with each other, and that such variations are within the scope of present implementations.

In method 800, device 103b (e.g., a tablet device) is used to search for content via server 101 to cause content to be pushed to device 103b and device 103a (e.g., a PDA).

At 801, application 236 is used to search for content on server 101 ("Discover Content"). In other words, a search for content is performed in any suitable manner, using suitable search terms, which can be as general or as specific as desired. At 803 it is determined whether or not discovered content is to be acquired/downloaded/pushed to selected devices 103. If not, method 800 ends at 805. Otherwise at 807 it is determined at server 101 whether given selected content is for the active device 103b (the device 103 that is accessing server 101). To determine whether the given selected content is for the active device 103b, it is appreciated that server 101 is enabled to determine with which device 103 it is in communication with, as described above. The associated attribute data 160b can then be compared to content attribute data 155 of content that meets the search criteria, as described above.

When the given selected content is for active device 103b, at 809 server 101 causes the content acquisition process to complete, for example by causing the given selected content in the form of associated content installation data 150 to be pushed to device 103b at 811, such that the given selected content is delivered to device 103b.

Returning to 807, when the given selected content is not for active device 103b, at 811 a device 103 is chosen to route the given selected content to, for example device 103a; it is assumed that the content attribute data 155 of the given selected content generally matches attribute data 160a of device 103a. At 815 it is determined whether device 103a is on-line, for example by pinging device 103a and/or by determining whether device 103a is currently registered with an associated network. When device 103a is not on-line, at 817 the given selected content in the form of associated content installation data 150 is stored until device 103a is on-line, for example at a push server.

When device 103a is on-line, the given selected content is delivered/pushed to device 103a at 819, in the form of associated content installation data 150.

Figure 9:
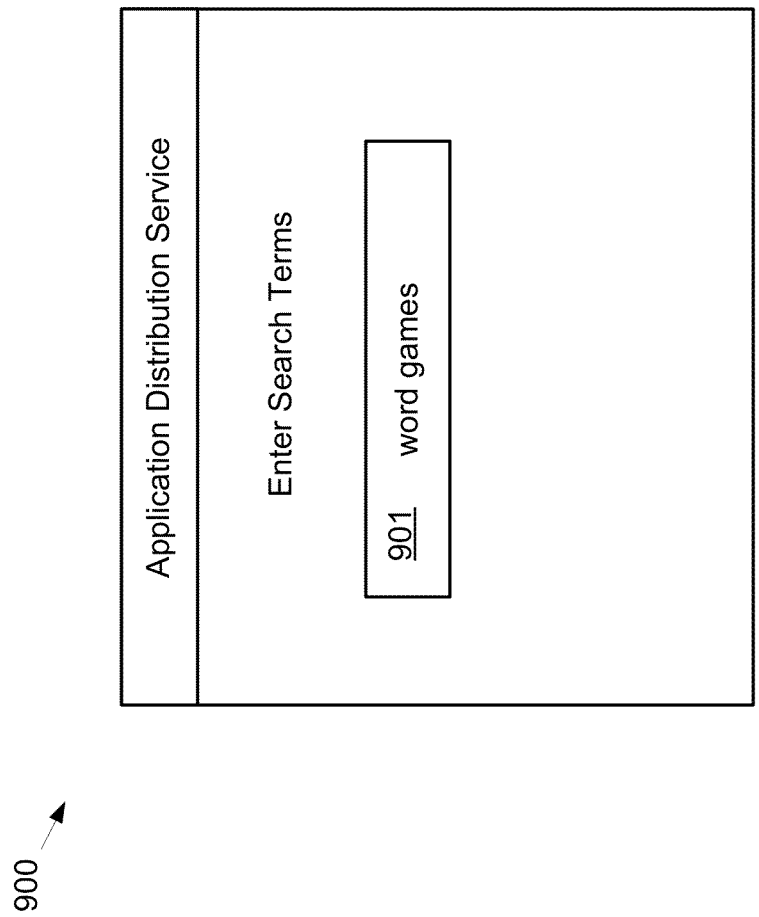
FIGS. 9 to 14 depict renderings of graphic user interfaces for distribution of content, according to non-limiting implementations.
Figure 10:
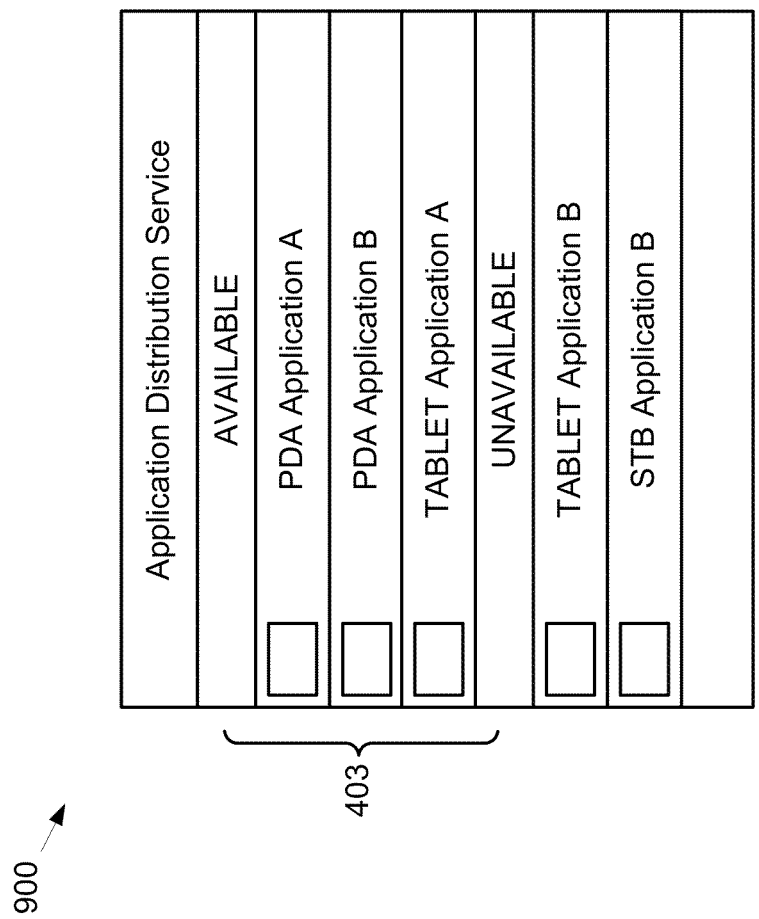
Figure 11:
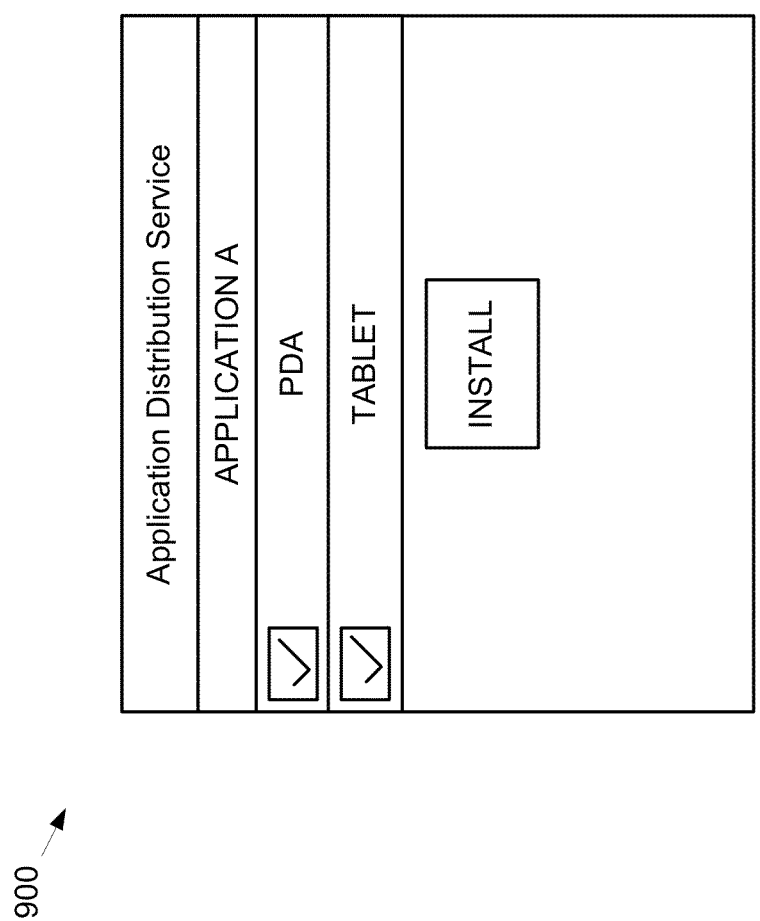

Attention is now directed to FIGS. 9 to 11 which depict a rendering of a GUI (Graphic User Interface) 900 for selection and distribution of content, as rendered at for example, device 103a. In other words, in FIGS. 9 to 11 it is assumed that device 103a ("PDA") is the active device. FIG. 9 depicts a search screen in which search criteria can be received in a field 901, for example "word games." FIG. 10 depicts the search results and includes list 403 of content available for installation at devices 103 that match the at least one search parameter and that are available for installation at devices 103. In depicted non-limiting example implementations, content was found for installation on device 103a and device 103b; specifically, an Application A was found that could be installed on either of device 103a ("PDA") and device 103b ("Tablet"). However, an Application B was also found except Application B could be installed on device 103a but not devices 103b, 103d ("STB"). It is appreciated that an application can then be selected from list 403 for installation at a selected device 103. For example, either "Application A" could be selected, and options are then provided, as in FIG. 11, to trigger pushing of associated installation data 150 to device 103a and/or device 103b. In some implementations, each device 103 is selected via respective checkboxes or the like (e.g., radio buttons, selectable icons, etc.) and when selections are received, an "INSTALL" virtual button (or the like) is actuated, which causes selection data 601 to be transmitted to server 101, which in turn causes the associated installation data 150 to be transmitted to each selected device 103. It is appreciated that each set of installation data 150 can be different for each device 103 even though the associated application is the same.

Figure 12:
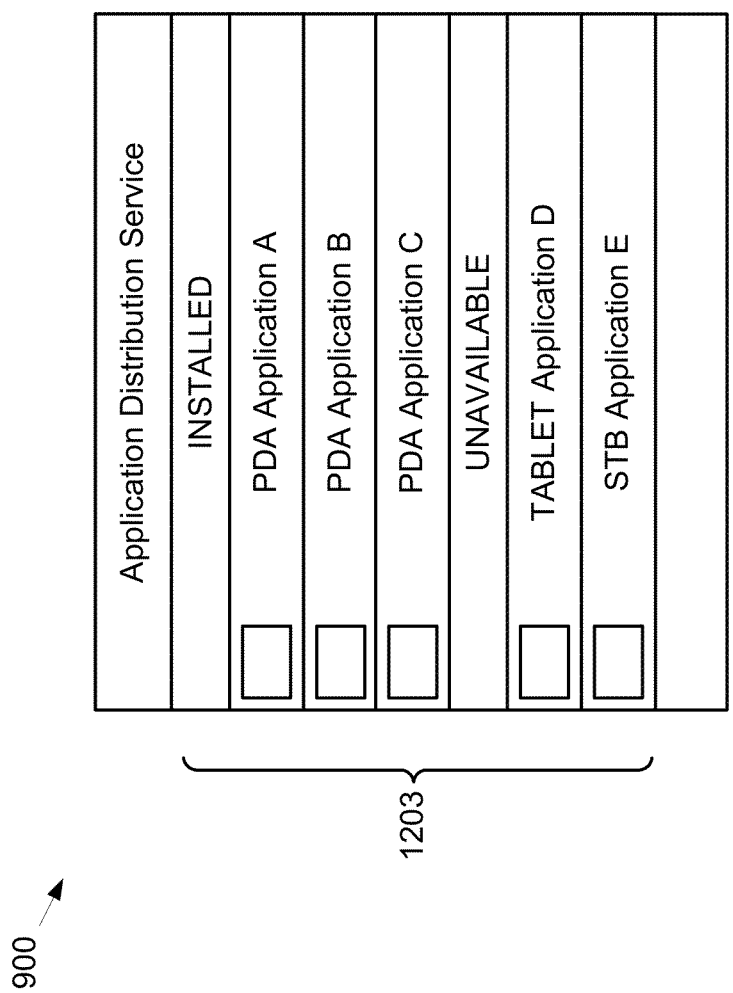
Figure 13:
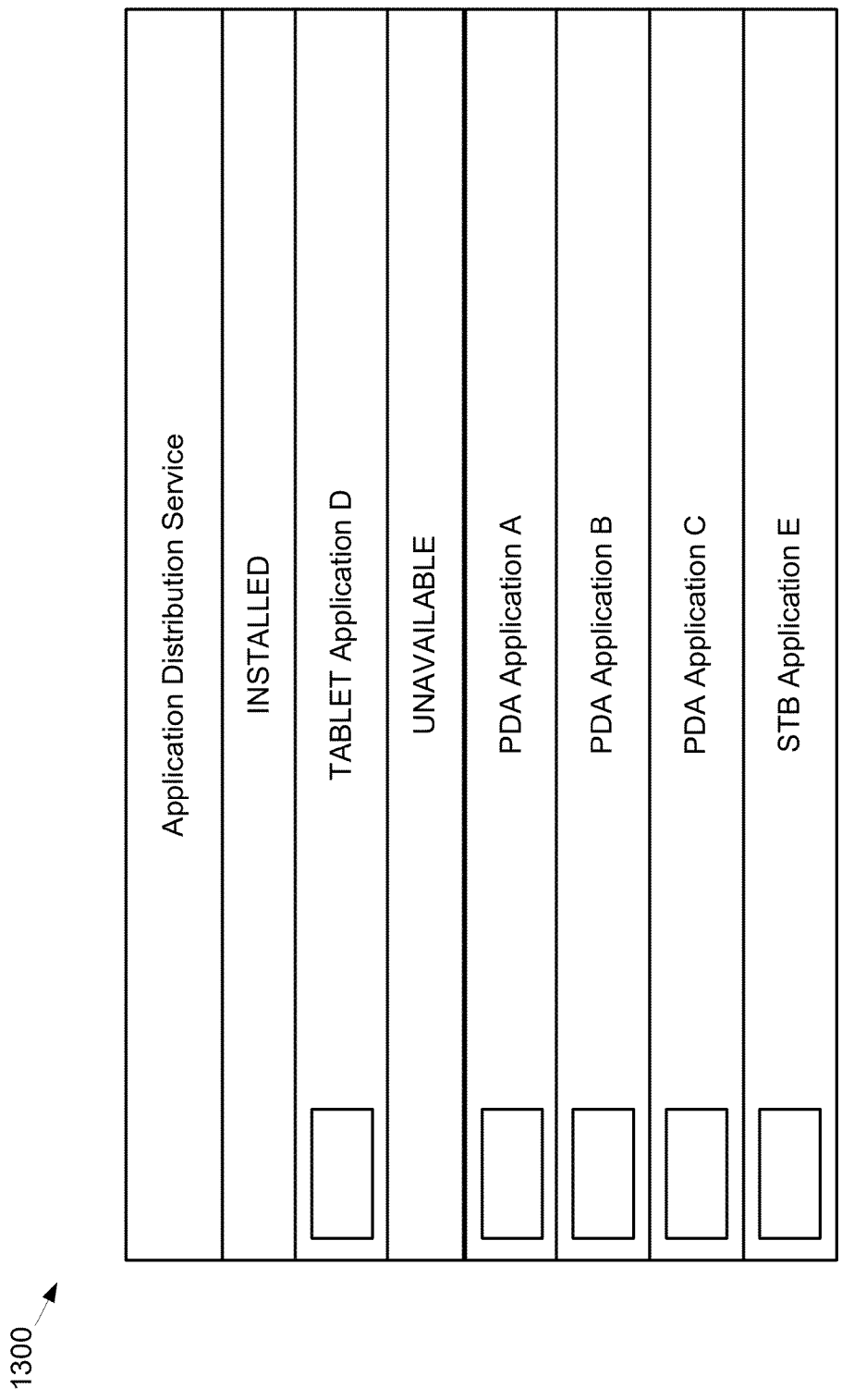
Figure 14:
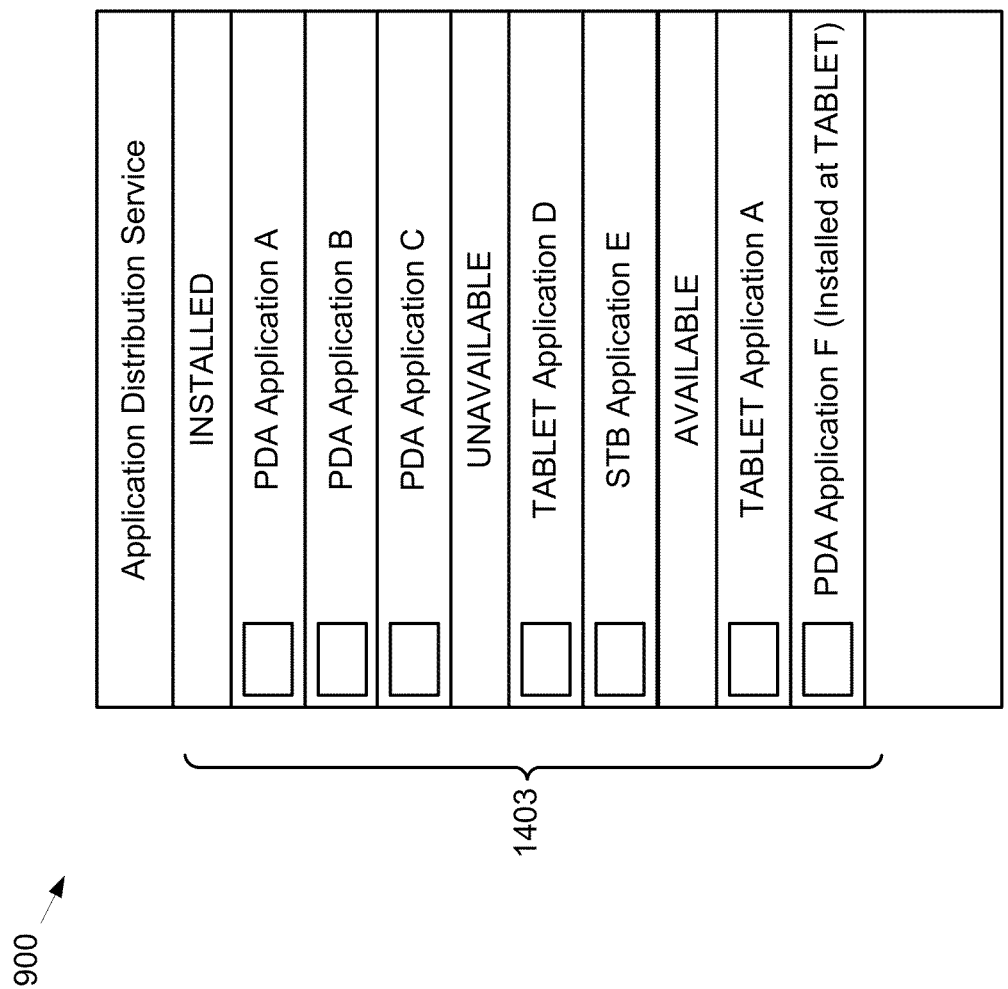
Figure 15:
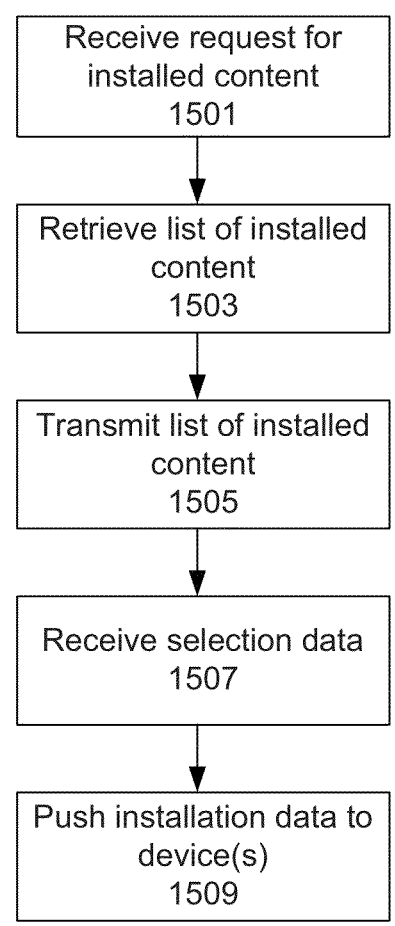
FIG. 15 depicts a method for additional distribution of content, according to non-limiting implementations.

FIGS. 12-14 depict a GUI providing a list of content already installed at the devices 103 and indication of content that is available for installation at others of the devices 103 according to some implementations. FIG. 15 illustrates a method 1500 for further selection and distribution of content. In order to assist in the explanation of method 1500, it will be assumed that method 1500 is performed using system 100. Furthermore, the following discussion of method 1500 will lead to a further understanding of system 100 and its various components. However, it is to be understood that system 100 and/or method 1500 can be varied, and need not work exactly as discussed herein in conjunction with each other, and that such variations are within the scope of present implementations. It is appreciated that in the following description, method 1500 is implemented in system 100 by processing unit 120. FIGS. 12-14 are described below in conjunction with method 1500 of FIG. 15.

After one or more content has been installed on one or more of devices 103, any of the devices 103 can communicate with the server 101 to obtain status information regarding which content is installed on which device(s) and additionally indication or recommendation information about content available for installation (collectively referred to as installed content information). At a block 1501 of FIG. 15, server 101 receives a request for installed content information from one of the devices 103 (referred to as the active device 103, such as, active device 103*a*). The request is transmitted from device 103*a* to server 101 via link 105*a*. This request may be similar to request 401 discussed above with reference to FIGS. 3 and 4.

The request can comprise a request initiated from application 236 to access a content distribution service. It is further appreciated that the request is understood to have been received by server 101, for example, via link 105*a* from device 103*a*. Alternatively, a communication session between server 101 and device 103*a* can be established in which device 103*a* "logs in" to a content distribution service such as application 136, via the associated application 236 at device 103*a*. For example, as will be described below, a rendering of application 236 can be provided at display 224 to access application 136 at server 101, with data being exchanged between applications 136, 236 to cause content to be distributed.

In response at a block 1503, server 101 interfaces with database 140 to retrieve a list of installed content information corresponding to the active device 103*a* and the other devices 103 associated with the active device 103*a*, a user account, or user. Since server 101 pushed or coordinated pushing specific content to specific devices 103, server 101 and/or database 140 has a complete history of what content has been installed on which of devices 103. Moreover, since server 101 and/or database 140 is also the repository for content and associated attribute data about the content (e.g., to determine the type of devices that can handle respective content), server 101 is able to provide indication or recommendations about content suitable for installation.

Once the list has been compiled, the list or an indication thereof is transmitted from server 101 to the active device 103*a* via link 105*a* (block 1505). The list can then be displayed at display 224 of active device 103*a* by, for example, application 236. Examples of such a list are shown in FIG. 12 at a list 1203 and in FIG. 14 as a list 1403.

FIG. 12 shows a GUI 600 including the list 1203. In these implementations, the list 1203 is provided that lists content that is INSTALLED at the active device 103*a*, and which content is installed at other devices 103*b*, 103*d*, such content being UNAVAILABLE for active device 103*a*. A similar GUI 1300 is provided in FIG. 13, presuming that device 103*b* ("TABLET") is the active device. Comparing FIGS. 12 and 13, it is appreciated that Applications A, B, C are installed at device 103*a* ("PDA") but are not available for installation at other devices 103. Similarly, it is appreciated that Application D is installed at device 103*b*, but is not available for other devices 103; it is further appreciated that Application E is installed at device 103*d* ("STB"), but is not available for other devices 103. Device 103*c* is not referenced as device 103*c* is used merely to access server 101 via a browser, but does not generally run content available through server 101.

Attention is next directed to FIG. 14 which depicts GUI 900 in another mode. In these implementations, a list 1403 is provided which shows content which is INSTALLED at the active device 103*a*, which content is installed at other devices 103*b*, 103*d*, which is UNAVAILABLE for active device 103*a*, content is installed at other devices 103*b*, 103*d* but AVAILABLE for active device 103*a*, as well as content installed at device 103*a* which is AVAILABLE for other devices 103*b*, 103*d*. For example, the INSTALLED and UNAVAILABLE sections of list 1403 are similar to list 1203. However list 1403 further provides an "AVAILABLE" section which indicates that Application A, presently installed on "PDA" can also be selected for installation at device 103*b* ("TABLET"). Similarly, an Application F installed at devices 103*b* can also be selected and installed at device 103*a*.

In any event, list 1403 comprises an indication that given content installed at a given device 103 is available for installation at other devices 103. Determination of whether given content is available for a given device 103 can be based on comparing attribute data 160 of a given device 103 with content attribute data 155. In any event, list 1403 comprises an indication that given content installed at a given device 103 is unavailable for installation at other devices 103. Determination of whether given content is unavailable for a given device 103 can be based on comparing attribute data 160 of a given device 103 with content attribute data 155.

It is further appreciated that database 140, or the like, further stores indications 1501 of what content is installed on what device 103. For example, such indications can be stored in attribute data 160 and/or separately. These indications can be accessed by server 101 to generate lists 1203, 1403. It is furthermore appreciated that lists 1203, 1403 can be generated separately and/or as part of list 403.

It is furthermore appreciated that lists 403, 1203, 1403 can be sorted and provided in any suitable manner. In some implementations, lists 403, 1203, 1403 can be sorted according to at least one of respective content (e.g., by application), the plurality of associated computing devices, and availability for installation of each of the respective applications.

A selection of content from list 1203 or 1403 is then received in any suitable manner from input device 200 and the active device 103 generates a selection data indicative of a subset of the content on list 1203 or 1403 selected for installation at respective selected devices 103. Active device 103 transmits the selection data to server 101, and server 101 receives such selection data at a block 1507.

Lastly at a block 1509, server 101 processes the received selection data and causes respective installation data to be pushed to respective selected devices 103. In some implementations, server 101 transmits installation data, however in other implementations, server 101 transmits instructions to trigger the push of installation data to a push server (not depicted) or the like, which in turn retrieves and transmits appropriate installation data to respective devices 103.

In some implementations, associated content can be installed automatically when installation data is received at respective device 103, while in other implementations, associated content can be installed upon receiving confirmation that the associated content is to be installed from respective input devices 200 (e.g., application 236 provides an indication of receipt of installation data and requests confirmation or the like that the installation is to be installed before proceeding).

Hence, method 1500 provides a list 1203 or 1403 of content respective to each device 103, and pushes selected content to respective selected devices 103. Furthermore, at least one of the respective selected devices 103 is different from the active device 103, such that active device 103 triggers installation of given selected content at a different computing device 103 from active device 103 via the selection data.

It is furthermore appreciated, that requests for list 1203, 1403 and associated responses can be implemented in suitable APIs (application programming interfaces) at either of applications 136, 236.

Those skilled in the art will appreciate that in some implementations, the functionality of server 101 and devices 103 can be implemented using pre-programmed hardware or firmware elements (e.g., application specific integrated circuits (ASICs), electrically erasable programmable read-only memories (EEPROMs), etc.), or other related components. In other implementations, the functionality of server 101 and devices 103 can be achieved using a computing apparatus that has access to a code memory (not shown) which stores computer-readable program code for operation of the computing apparatus. The computer-readable program code could be stored on a computer readable storage medium which is fixed, tangible, and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. For example, applications 136, 236 and/or methods 300, 800, 1500. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A method comprising:

receiving at a server, from a first computing device, via a communication interface, a request to provide content available to a plurality of associated computing devices, the plurality of associated computing devices including the first computing device;

retrieving from a content database a list of the content available for installation at the plurality of associated computing devices by comparing respective device attributes of each of the plurality of associated computing devices with respective content attributes associated with the content, wherein the list is accompanied by device installation indications including:

indications of which respective content is available for installation at given ones of the plurality of associated computing devices;

indications of installed content already installed at given ones of the plurality of associated computing devices; and indications that given content installed at the given ones of the plurality of associated computing devices is unavailable for installation at others of the plurality of associated computing devices;

transmitting, to the first computing device via the communication interface, the list and the device installation indications;

receiving, from a first computing device via the communication interface, selection data indicative of a proper subset of the content on the list selected for installation at respective selected devices of the plurality of associated computing devices; and causing respective installation data for installing respective selected content to be pushed to the respective selected devices.

2. The method of claim 1, wherein the device installation indications further include indications that the installed content already installed at the given ones of the plurality of associated computing devices is available for installation at others of the plurality of associated computing devices.

3. The method of claim 1, wherein the respective installation data is stored in the content database in association with the respective content attributes.

4. The method of claim 1, wherein at least one of the respective selected devices is different from the first computing device such that the first computing device triggers installation of a given selected content at a different computing device via the selection data.

5. The method of claim 1, wherein the device installation indications are sorted according to at least one of the respective content, the plurality of associated computing devices, and availability for installation of each of the respective content.

6. A method comprising:
receiving at a server, from a first computing device, via a communication interface, a request to provide content installed at a plurality of associated computing devices, the plurality of associated computing devices including the first computing device;

retrieving from a content database device installation indications including indications of installed content already installed at given ones of the plurality of associated computing devices and indications that the installed content already installed at the given ones of the plurality of associated computing devices is unavailable for installation at others of the plurality of associated computing devices by comparing respective device attributes of each of the plurality of associated computing devices with respective content attributes associated with the content;

transmitting, to the first computing device via the communication interface, the device installation indications;

receiving, from a first computing device via the communication interface, selection data indicative of a proper subset of the content on the device installation indications selected for installation at respective selected devices of the plurality of associated computing devices; and causing respective installation data for installing respective selected content to be pushed to the respective selected devices.

7. A server device comprising:
a processor and a communication interface, the processor enabled to:

receive, from a first computing device via the communication interface, a request to provide content available to a plurality of associated computing devices, the plurality of associated computing devices including the first computing device;

retrieve from a content database a list of the content available for installation at the plurality of associated computing devices by comparing respective device attributes of each of the plurality of associated computing devices with respective content attributes associated with the content, wherein the list is accompanied by device installation indications including:

indications of which respective content is available for installation at given ones of the plurality of associated computing devices;

indications of installed content already installed at given ones of the plurality of associated computing devices; and indications that the installed content already installed at the given ones of the plurality of associated computing devices is unavailable for installation at others of the plurality of associated computing devices;

transmit, to the first computing device via the communication interface, the list and the device installation indications;

receive, from the first computing device via the communication interface, selection data indicative of a proper subset of the content on the list selected for installation at respective selected devices of the plurality of associated computing devices; and cause respective installation data for installing respective selected content to be pushed to the respective selected devices.

8. The server device of claim 7, wherein the device installation indications further include indications that the installed content already installed at the given ones of the plurality of associated computing devices is available for installation at others of the plurality of associated computing devices.

9. The server device of claim 7, further comprising a memory storing the content database.

10. The server device of claim 7, wherein the respective installation data is stored in the content database in association with the respective content attributes.

11. The server device of claim 7, wherein at least one of the respective selected devices is different from the first computing device such that the first computing device triggers installation of a given selected content at a different computing device via the selection data.

12. The server device of claim 7, wherein the device installation indications are sorted according to at least one of the respective content, the plurality of associated computing devices, and availability for installation of each of the respective content.

13. A server device comprising:
a processor and a communication interface, the processor enabled to:

receive, from a first computing device via the communication interface, a request to provide content installed at a plurality of associated computing devices, the plurality of associated computing devices including the first computing device;

retrieve from a content database device installation indications including indications of installed content already installed at given ones of the plurality of associated computing devices and indications that the installed content already installed at the given ones of the plurality of associated computing devices is unavailable for installation at others of the plurality of associated computing devices by comparing respective device attributes of each of the plurality of associated computing devices with respective content attributes associated with the content;

transmit, to the first computing device via the communication interface, the device installation indications;

receive, from the first computing device via the communication interface, selection data indicative of a proper subset of the content on the device installation indications selected for installation at respective selected devices of the plurality of associated computing devices; and cause respective installation data for installing respective selected content to be pushed to the respective selected devices.

14. A computer program product, comprising a non-transitory computer usable medium having a computer readable program code adapted to be executed to implement a method for:

receiving at a server, from a first computing device, via a communication interface, a request to provide content available to a plurality of associated computing devices, the plurality of associated computing devices including the first computing device;

retrieving from a content database a list of the content available for installation at the plurality of associated computing devices by comparing respective device attributes of each of the plurality of associated computing devices with respective content attributes associated with the content, wherein the list is accompanied by device installation indications including:

indications of which respective content is unavailable available for installation at given ones of the plurality of associated computing devices;

indications of installed content already installed at given ones of the plurality of associated computing devices; and indications that the installed content already installed at the given ones of the plurality of associated computing devices is unavailable for installation at others of the plurality of associated computing devices;

transmitting, to the first computing device via the communication interface, the list and the device installation indications;

receiving, from a first computing device via the communication interface, selection data indicative of a proper subset of the content on the list selected for installation at respective selected devices of the plurality of associated computing devices; and causing respective installation data for installing respective selected content to be pushed to the respective selected devices.

15. A computer program product, comprising a non-transitory computer usable medium having a computer readable program code adapted to be executed to implement a method for:

retrieving from a content database device installation indications including indications of installed content already installed at given ones of the plurality of associated computing devices and indications that the installed content already installed at the given ones of the plurality of associated computing devices is unavailable for installation at others of the plurality of associated computing devices by comparing respective device attributes of each of the plurality of associated computing devices with respective content attributes associated with the content;

transmitting, to the first computing device via the communication interface, the device installation indications;

receiving, from a first computing device via the communication interface, selection data indicative of a proper subset of the content on the device installation indications selected for installation at respective selected devices of the plurality of associated computing devices; and causing respective installation data for installing respective selected content to be pushed to the respective selected devices.

\* \* \* \* \*